(12) United States Patent
Zhang et al.

(10) Patent No.: US 9,575,680 B1
(45) Date of Patent: Feb. 21, 2017

(54) DEDUPLICATION REHYDRATION

(71) Applicant: Veritas Technologies LLC, Mountain View, CA (US)

(72) Inventors: Lei Hu Zhang, Beijing (CN); Xianbo Zhang, Plymouth, MN (US)

(73) Assignee: Veritas Technologies LLC, Mountain View, CA (US)

( * ) Notice: Subject to any disclaimer, the term of this patent is extended or adjusted under 35 U.S.C. 154(b) by 235 days.

(21) Appl. No.: 14/466,210

(22) Filed: Aug. 22, 2014

(51) Int. Cl.
  *G06F 12/16* (2006.01)
  *G06F 3/06* (2006.01)

(52) U.S. Cl.
  CPC ............ *G06F 3/0641* (2013.01); *G06F 3/067* (2013.01); *G06F 3/0619* (2013.01)

(58) Field of Classification Search
  CPC ....... G06F 3/0641; G06F 3/0619; G06F 3/067
  USPC ......................................................... 711/162
  See application file for complete search history.

(56) References Cited

U.S. PATENT DOCUMENTS

| | | | |
|---|---|---|---|
| 5,276,860 A | 1/1994 | Fortier et al. | |
| 5,535,381 A | 7/1996 | Kopper | |
| 5,555,371 A | 9/1996 | Duyanovich et al. | |
| 5,559,991 A | 9/1996 | Kanfi | |
| 5,561,421 A | 10/1996 | Smith et al. | |
| 5,835,953 A | 11/1998 | Ohran | |
| 5,990,810 A | 11/1999 | Williams | |
| 5,991,542 A | 11/1999 | Han et al. | |
| 6,014,676 A | 1/2000 | McClain | |
| 6,029,168 A | 2/2000 | Frey | |
| 6,085,298 A | 7/2000 | Ohran | |
| 6,101,585 A | 8/2000 | Brown et al. | |
| 6,141,784 A | 10/2000 | Davis et al. | |
| 6,360,330 B1 | 3/2002 | Mutalik et al. | |
| 6,389,433 B1 | 5/2002 | Bolosky et al. | |
| 6,513,051 B1 | 1/2003 | Bolosky et al. | |
| 6,542,962 B2 | 4/2003 | Kodama et al. | |

(Continued)

FOREIGN PATENT DOCUMENTS

EP  0838758 A2  4/1998

OTHER PUBLICATIONS

Bromley et al., U.S. Appl. No. 11/641,389, entitled "Single Instance Storage", filed Dec. 18, 2006, 30 pages.

(Continued)

*Primary Examiner* — Jae Yu
(74) *Attorney, Agent, or Firm* — Rory D. Rankin; Meyertons, Hood, Kivlin, Kowert & Goetzel, P.C.

(57) ABSTRACT

A method for deduplication rehydration is described. In one embodiment, a request to restore a backup image is received. The backup image is stored in a deduplication system. The backup image includes a plurality of data segments. The method includes determining locality information for at least one of the plurality of data segments. The locality information includes information regarding a location of the at least one data segment in relation to each other data segment of the plurality of data segments in the backup image. The method includes obtaining an identifier of each data container storing the plurality of data segments of the backup image, determining a degree to which the plurality of data segments of the backup image are processed by prefetching, and prefetching one or more of the plurality of target data segments from a data container based at least in part on a predetermined effectiveness threshold.

20 Claims, 10 Drawing Sheets

(56) References Cited

U.S. PATENT DOCUMENTS

| | | | |
|---|---|---|---|
| 6,640,278 B1 | 10/2003 | Nolan et al. |
| 6,665,815 B1 | 12/2003 | Goldstein et al. |
| 6,714,952 B2 | 3/2004 | Dunham et al. |
| 6,785,786 B1 | 8/2004 | Gold et al. |
| 6,829,688 B2 | 12/2004 | Grubbs et al. |
| 6,847,983 B2 | 1/2005 | Somalwar et al. |
| 6,865,655 B1 | 3/2005 | Andersen |
| 6,880,051 B2 | 4/2005 | Timpanaro-Perrotta |
| 6,892,250 B2 | 5/2005 | Hoskins |
| 6,910,112 B2 | 6/2005 | Berkowitz et al. |
| 6,920,537 B2 | 7/2005 | Ofek et al. |
| 6,938,135 B1 | 8/2005 | Kekre et al. |
| 6,976,039 B2 | 12/2005 | Chefalas et al. |
| 6,983,365 B1 | 1/2006 | Douceur et al. |
| 6,985,926 B1 | 1/2006 | Ferlauto et al. |
| 7,047,212 B1 | 5/2006 | Pych et al. |
| 7,055,008 B2 | 5/2006 | Niles et al. |
| 7,136,976 B2 | 11/2006 | Saika |
| 7,146,429 B2 | 12/2006 | Michel |
| 7,152,060 B2 | 12/2006 | Borthwick et al. |
| 7,200,604 B2 | 4/2007 | Forman et al. |
| 7,213,158 B2 | 5/2007 | Bantz et al. |
| 7,257,104 B2 | 8/2007 | Shitama |
| 7,257,643 B2 | 8/2007 | Mathew et al. |
| 7,287,019 B2 | 10/2007 | Kapoor et al. |
| 7,310,644 B2 | 12/2007 | Adya et al. |
| 7,318,072 B2 | 1/2008 | Margolus et al. |
| 7,359,920 B1 | 4/2008 | Rybicki et al. |
| 7,389,394 B1 | 6/2008 | Karr et al. |
| 7,401,194 B2 | 7/2008 | Jewell |
| 7,409,523 B2 | 8/2008 | Pudipeddi et al. |
| 7,424,514 B2 | 9/2008 | Noble et al. |
| 7,454,592 B1 | 11/2008 | Shah et al. |
| 7,478,113 B1 | 1/2009 | De Spiegeleer et al. |
| 7,529,785 B1 | 5/2009 | Spertus et al. |
| 7,546,319 B1 | 6/2009 | Srinivasan et al. |
| 7,567,188 B1 | 7/2009 | Anglin et al. |
| 7,584,338 B1 | 9/2009 | Bricker et al. |
| 7,644,136 B2 | 1/2010 | Rose et al. |
| 7,661,121 B2 | 2/2010 | Smith et al. |
| 7,685,459 B1 | 3/2010 | De Spiegeleer et al. |
| 7,689,764 B1 | 3/2010 | De Spiegeleer et al. |
| 7,725,704 B1 | 5/2010 | Beaverson et al. |
| 7,814,149 B1 | 10/2010 | Stringham |
| 7,818,495 B2 | 10/2010 | Tanaka et al. |
| 7,818,535 B1 | 10/2010 | Bono et al. |
| 7,870,105 B2 | 1/2011 | Arakawa et al. |
| 8,136,025 B1 | 3/2012 | Zhu et al. |
| 8,166,012 B2 | 4/2012 | Reddy et al. |
| 8,311,964 B1 | 11/2012 | Efstathopoulos et al. |
| 8,315,985 B1 | 11/2012 | Ohr et al. |
| 8,655,939 B2 | 2/2014 | Redlich et al. |
| 8,762,338 B2 | 6/2014 | Christiaens et al. |
| 8,983,952 B1 | 3/2015 | Zhang et al. |
| 9,298,707 B1 | 3/2016 | Zhang et al. |
| 2001/0045962 A1 | 11/2001 | Lee et al. |
| 2002/0049718 A1 | 4/2002 | Kleiman et al. |
| 2002/0107877 A1 | 8/2002 | Whiting et al. |
| 2003/0163495 A1 | 8/2003 | Lanzatella et al. |
| 2003/0177149 A1 | 9/2003 | Coombs |
| 2004/0044707 A1 | 3/2004 | Richard |
| 2004/0088504 A1* | 5/2004 | Hsu | G06F 3/0613 |
| | | | 711/158 |
| 2004/0143731 A1 | 7/2004 | Audebert et al. |
| 2004/0268068 A1 | 12/2004 | Curran et al. |
| 2005/0027766 A1 | 2/2005 | Ben et al. |
| 2005/0198328 A1 | 9/2005 | Lee et al. |
| 2005/0204108 A1 | 9/2005 | Ofek et al. |
| 2005/0216788 A1 | 9/2005 | Mani-Meitav et al. |
| 2005/0216813 A1 | 9/2005 | Cutts et al. |
| 2005/0240628 A1 | 10/2005 | Jiang et al. |
| 2006/0008256 A1 | 1/2006 | Khedouri et al. |
| 2006/0026219 A1 | 2/2006 | Orenstein et al. |
| 2006/0184587 A1 | 8/2006 | Federwisch et al. |
| 2006/0271540 A1 | 11/2006 | Williams |
| 2007/0005915 A1* | 1/2007 | Thompson | G06F 11/1451 |
| | | | 711/162 |
| 2007/0016560 A1 | 1/2007 | Gu et al. |
| 2007/0067332 A1 | 3/2007 | Gallagher et al. |
| 2007/0083491 A1 | 4/2007 | Walmsley et al. |
| 2007/0192548 A1 | 8/2007 | Williams |
| 2007/0198659 A1 | 8/2007 | Lam |
| 2007/0250674 A1 | 10/2007 | Fineberg et al. |
| 2007/0288494 A1 | 12/2007 | Chrin et al. |
| 2008/0005141 A1 | 1/2008 | Zheng et al. |
| 2008/0133561 A1 | 6/2008 | Dubnicki et al. |
| 2008/0154989 A1 | 6/2008 | Arman |
| 2008/0177799 A1 | 7/2008 | Wilson |
| 2008/0228939 A1 | 9/2008 | Samuels et al. |
| 2008/0243769 A1 | 10/2008 | Arbour et al. |
| 2008/0243878 A1 | 10/2008 | De Spiegeleer et al. |
| 2008/0243953 A1 | 10/2008 | Wu et al. |
| 2008/0244204 A1 | 10/2008 | Cremelie et al. |
| 2008/0313207 A1 | 12/2008 | Modad et al. |
| 2009/0132616 A1 | 5/2009 | Winter et al. |
| 2009/0171888 A1 | 7/2009 | Anglin |
| 2009/0177855 A1 | 7/2009 | Drews et al. |
| 2009/0204636 A1 | 8/2009 | Li et al. |
| 2009/0204650 A1 | 8/2009 | Wong et al. |
| 2009/0228520 A1 | 9/2009 | Yahata et al. |
| 2009/0313248 A1 | 12/2009 | Balachandran et al. |
| 2009/0319534 A1 | 12/2009 | Gokhale |
| 2010/0082695 A1 | 4/2010 | Hardt |
| 2010/0082700 A1 | 4/2010 | Parab |
| 2010/0083003 A1 | 4/2010 | Spackman |
| 2010/0131480 A1 | 5/2010 | Schneider |
| 2010/0146013 A1 | 6/2010 | Mather |
| 2010/0250896 A1 | 9/2010 | Matze |
| 2010/0257403 A1 | 10/2010 | Virk et al. |
| 2010/0274982 A1 | 10/2010 | Mehr et al. |
| 2010/0281077 A1 | 11/2010 | Lillibridge et al. |
| 2010/0306175 A1 | 12/2010 | Johnson et al. |
| 2010/0332452 A1 | 12/2010 | Hsu et al. |
| 2011/0099200 A1 | 4/2011 | Blount et al. |
| 2011/0125716 A1 | 5/2011 | Drews et al. |

OTHER PUBLICATIONS

"Symantec NetBackup PureDisk™ Getting Started Guide", 2009, 111 pages, Release 6.6, revision 2, Symantec Corporation, http://www.symantec.com/business/support/resources/sites/BUSINESS/content/live/TECHNICALSOLUTION/75000/TECH75147/en_US/334167.pdf. [Retrieved Jun. 20, 2011].

"Next-generation backup and recovery with global, source data de-duplication", EMC Avamar Data Sheet, 2008, 4 pages, http://www.openstore.com/pdfs/products/EMC/h2568_emc_avamar_ds_ldv.pdf. [Retrieved Aug. 11, 2016].

"Schedule a Data Verification Operation", Oct. 27, 2007, 1 page, http://web.archive.org/web/20071027154929/http://documentation.commvault.com/commvault/release_7_0_0/books_online_1/english_us/features/data_verification/how_to/storpol_sched_verify_data.htm. [Retrieved Jun. 21, 2011].

"Data Invulnerability Architecture: The Ultimate in Data Integrity and Recoverability", Data Domain, 2009, 1 page, http://www.datadomain.com/products/DIA.html. [Retrieved Jun. 5, 2011].

"Press Release: Data Domain Delivers Breakthrough Protection and Simplicity in a Cost-Effective, Disk-Based Recovery Appliance", Data Domain, Jun. 9, 2003, 4 pages, http://www.datadomain.com/news/press_rel_060903.html. [Retrieved Jun. 20, 2011].

Zhu, et al., "Avoiding the Disk Bottleneck in the Data Domain Deduplication File System", FAST'08 Proceedings of the 6th USENIX Conference on File and Storage Technologies, Feb. 26, 2008, pp. 269-282, USENIX Association Berkeley, CA, USA.

Search Report in United Kingdom application No. GB0805503.0, dated Jul. 24, 2008, 1 page.

"Veritas NetBackup PureDisk™ Remote Office Edition Administrator's Guide", 2006, 262 pages, Release 6.0, MP1, Revision 6.0.4, Symantec Corporation.

"NetBackup 6.0 PureDisk Remote Office Edition", Apr. 5, 2006, 2 pages, http://web.archive.org/web/20081117092813/http://www.distrilogie.be/BE/news/news.aspx?id=236. [Retrieved Aug. 6, 2009].

(56) References Cited

OTHER PUBLICATIONS

De Wispelaere, Wim, "Secure Optimized Data Protection for Remote Offices: An Overview of Veritas NetBackup PureDisk™ Remote Office Edition", Mar. 7, 2006, 20 pages, Symantec Corporation.
"A Data Cleansing Software Suite for Business and IT users", Data Ladder—Get the most out of your data, 2014, www.dataladder.com, 1 page. [Retrieved Nov. 12, 2014].
"Midrange & Mainframe Systems", Data Domain, May 25, 2010, http://web.archive.org/web/20100525234619/http://www.datadomain.com/solutions/mainframe.html, 1 page. [Retrieved Apr. 24, 2015].
"An EMC Perspective on Data De-Duplication for Backup", EMC Perspective, Jun. 2008, 11 pages, http://web.archive.org/web/20090320022757/http://www.emc.com/collateral/emc-perspective/h4413-data-dedup.pdf. [Retrieved Apr. 24, 2015].
"Dedupe media going offline", Symantec Corporation, Jan. 12, 2010, 3 pages, http://aka-community.symantec.com/connect/pt-br/forums/dedupe-media-going-offline. [Retrieved Apr. 24, 2015].
Gralla, Preston, "Audio Dedupe Cleans up Your Music Collection", PCWorld, Feb. 27, 2010, 4 pages, http://web.archive.org/web/20110114085518/http://www.pcworld.com/article/188401/audio_dedupe_cleans_up_your_music_collection.html?tk=mod_rel. [Retrieved Apr. 24, 2015].
Cremelie, Nick, U.S. Appl. No. 12/899,339, entitled "System and Method for Efficient Data Removal in a Deduplicated Storage System", filed Oct. 6, 2010, 31 pages.
"Windows DDK Glossary", 3 pages, http://msdn.microsoft.com/library/default.asp?url=/library/en-us/gloss/hh/gloss/glossary.sub.--628b1dfc-c8f0-4143-a4ef-0dddae24be4b.xml.asp. [Retrieved May 14, 2003].
"RepliWeb® R-1 User Guide—Version 3.1", RepliWeb, Inc., 2002, 26 pages.
"FilesX Xchange Restore™ for Microsoft Exchange Server", FilesX, Inc., Aug. 2003, 2 pages.
"Instructor Articles", Veritas Education, Apr. 2003, 7 pages.
"EMC TimeFinder Family", Data Sheet, Oct. 2004, 8 pages, EMC Corporation.
"EMC TimeFinder Local Replication: Improve Recovery-Point Objectives and Reduce Risk", Oct. 2004, 2 pages, EMC Corporation.
"Storage Area Networking: High-Speed Data Sharing Among Multiple Computer Platforms", Tivoli Systems, Inc., an IBM company, 2000, 4 pages, ftp://ftp.software.ibm.com/software/tivoli/whitepapers/san_datasharing_wp.pdf.
"Storage Management: Best Practices", IBM Corporation, 2001, 11 pages, ftp://ftp.software.ibm.com/software/tivoli/whitepapers/wp-storage-bp.pdf.
Amiri, Khalil S., "Scalable and manageable storage systems", Ph.D. Thesis, Dept. of Electrical and Computer Engineering, Carnegie Mellon University, Pittsburgh, PA, Dec. 2000, pp. i-241, http://www.pdl.cmu.edu/PDL-FTP/NASD/amiri_thesis.pdf.
Wylie, et al., "Selecting the Right Data Distribution Scheme for a Survivable Storage System", Research Paper, School of Computer Science, Carnegie Mellon University, Pittsburgh, PA, May 2001, pp. 1-21, http://www.pdl.cmu.edu/PDL-FTP/Storage/CMU-CS-01-120.pdf.
Zhang, et al., U.S. Appl. No. 14/283,776, entitled "Systems and Methods for Retrieving Data", filed May 21, 2014, 49 pages.

\* cited by examiner

DEDUPLICATION REHYDRATION

BACKGROUND

Advancements in media delivery systems and data-related technologies continue to increase at a rapid pace. Increasing demand for accessible data has influenced the advances made to data-related technologies. Computer systems have increasingly become an integral part of data creation, data usage, and data storage. Computer systems may be used to carry out several data-related functions. The widespread access to data has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the widespread use of computers and mobile devices has come an increased presence of and continued advancements in data storage and cloud storage systems. A storage application may run in the background to store data on a device in an online storage system. Nevertheless, benefits may be realized by providing systems and methods for storage recovery systems.

SUMMARY

According to at least one embodiment, a method for deduplication rehydration is described. In one embodiment, the method may include receiving a request to restore a backup image. The backup image may be stored in a deduplication system. The backup image may include a plurality of data segments. The method may include determining locality information for at least one of the plurality of data segments. The locality information may include information regarding a location of the at least one data segment in relation to each other data segment of the plurality of data segments in the backup image. The method may include obtaining an identifier of each data container storing the plurality of data segments of the backup image and determining a degree to which the plurality of data segments of the backup image are processed by prefetching.

In some embodiments, the method may include calculating a prefetch ratio based on a complementary percentage of a value of a predetermined self-read ratio. The prefetch ratio may express the degree to which the plurality of data segments of the backup image are processed by prefetching. The method may include calculating a data segment sum. Calculating the data segment sum may include summing a number of data segments in the backup image with a number of data segments currently being prefetched by all prefetch threads. The method may include calculating a data container sum. Calculating the data container sum may include summing a number of unique data container files containing the plurality of data segments in the backup image with a number of unique data container files containing the data segments currently being prefetched by all prefetch threads.

In one embodiment, the method may include calculating a merged locality. Calculating the merged locality may include determining a ratio of the data segment sum to the data container sum. If the calculated merged locality satisfies a predetermined high-locality threshold, then the method may include setting a self-read ratio of the request to restore a backup image to 100 percent, the self-read ratio expressing the degree to which the plurality of data segments of the backup image are processed without prefetching.

In some embodiments, if the calculated merged locality satisfies a predetermined low-locality threshold and fails to satisfy a predetermined high-locality threshold, then the method may include calculating a magnification factor based on a ratio of merged locality to the low-locality threshold. The method may include calculating a self-read ratio based on a product of the magnification factor and a predetermined self-read-ratio baseline value. If the calculated merged locality fails to satisfy both a predetermined low-locality threshold and a predetermined high-locality threshold, then the method may include calculating a magnification factor based on a ratio of the low-locality threshold to merged locality. The method may include calculating a self-read ratio based on a complementary percentage of a product of the magnification factor and a complementary percentage of a predetermined self-read ratio-baseline value.

According to at least one embodiment, another method for deduplication rehydration is described. In one embodiment, the method may include receiving a request to restore a backup image. The backup image may be stored in a deduplication system. The backup image may include a plurality of data segments. The method may include determining locality information for at least one of the plurality of data segments. The locality information may include information regarding a location of the at least one data segment in relation to each other data segment of the plurality of data segments in the backup image. The method may include obtaining an identifier of each data container storing the plurality of data segments of the backup image and prefetching one or more of the plurality of target data segments from a data container based at least in part on a predetermined effectiveness threshold.

In one embodiment, the method may include iteratively determining length values for a consecutive sequence of one or more data segments in the data container. The iteratively determining length values may include determining a length of a first target data segment in the data container, adding at least one sequential data segment to a current length of the one or more data segments for each subsequent iteration, determining a length of target data segments in each subsequent iteration, and stopping the iterative determination of length values when a current length value exceeds the maximum read length or the current length of the one or more data segments includes all target data segments in the data container.

In some embodiments, the method may include saving the determined length values in an array of length values for each length value that does not exceed a determined length value of a final iteration. The method may include analyzing the one or more data segments within each consecutive sequence of one or more data segments from the final iteration length value to the shortest length value. The analyzing the one or more data segments may include determining a number of target data segments included within each consecutive sequence of one or more data segments and determining an effectiveness ratio for each consecutive sequence of one or more data segments. The effectiveness ratio may include a ratio of a length of the one or more target data segments within a first consecutive sequence of one or more data segments to a length value of the first consecutive sequence of one or more data segments.

In some embodiments, if the effectiveness ratio of an analyzed length satisfies an effectiveness threshold and the effectiveness ratio of the analyzed length is the largest of the effectiveness ratios in the array of length values to that point, then the method may include selecting the analyzed length and reading all of the data segments from the analyzed length into the temporary buffer. In some cases, the method may include reading the target data segments in the temporary buffer into a shared buffer. The shared buffer may include each of the data segments of the backup image. The method may include determining a value for at least one of a low-locality threshold, a high-locality threshold, a self-read-ratio baseline, and an effectiveness threshold based at least in part on analyzing system parameters and accessing previous test data.

A computing device configured for deduplication rehydration is also described. The computing device may include a processor and memory in electronic communication with the processor. The memory may store computer executable instructions that when executed by the processor cause the processor to perform the steps of receiving a request to restore a backup image. The backup image may be stored in a deduplication system. The backup image may include a plurality of data segments. The computer executable instructions may perform the steps of determining locality information for at least one of the plurality of data segments. The locality information may include information regarding a location of the at least one data segment in relation to each other data segment of the plurality of data segments in the backup image. The computer executable instructions may perform the steps of obtaining an identifier of each data container storing the plurality of data segments of the backup image and determining a degree to which the plurality of data segments of the backup image are processed by prefetching.

Another computing device configured for deduplication rehydration is also described. The computing device may include a processor and memory in electronic communication with the processor. The memory may store computer executable instructions that when executed by the processor cause the processor to perform the steps of receiving a request to restore a backup image. The backup image may be stored in a deduplication system. The backup image may include a plurality of data segments. The computer executable instructions may perform the steps of determining locality information for at least one of the plurality of data segments. The locality information may include information regarding a location of the at least one data segment in relation to each other data segment of the plurality of data segments in the backup image. The computer executable instructions may perform the steps of obtaining an identifier of each data container storing the plurality of data segments of the backup image and prefetching one or more of the plurality of target data segments from a data container based at least in part on a predetermined effectiveness threshold.

A non-transitory computer-readable storage medium storing computer executable instructions is also described. When the instructions are executed by a processor, the execution of the instructions may cause the processor to perform the steps of receiving a request to restore a backup image. The backup image may be stored in a deduplication system. The backup image may include a plurality of data segments. The instructions executed by the processor may perform the steps of determining locality information for at least one of the plurality of data segments. The locality information may include information regarding a location of the at least one data segment in relation to each other data segment of the plurality of data segments in the backup image. The instructions executed by the processor may perform the steps of obtaining an identifier of each data container storing the plurality of data segments of the backup image and determining a degree to which the plurality of data segments of the backup image are processed by prefetching.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
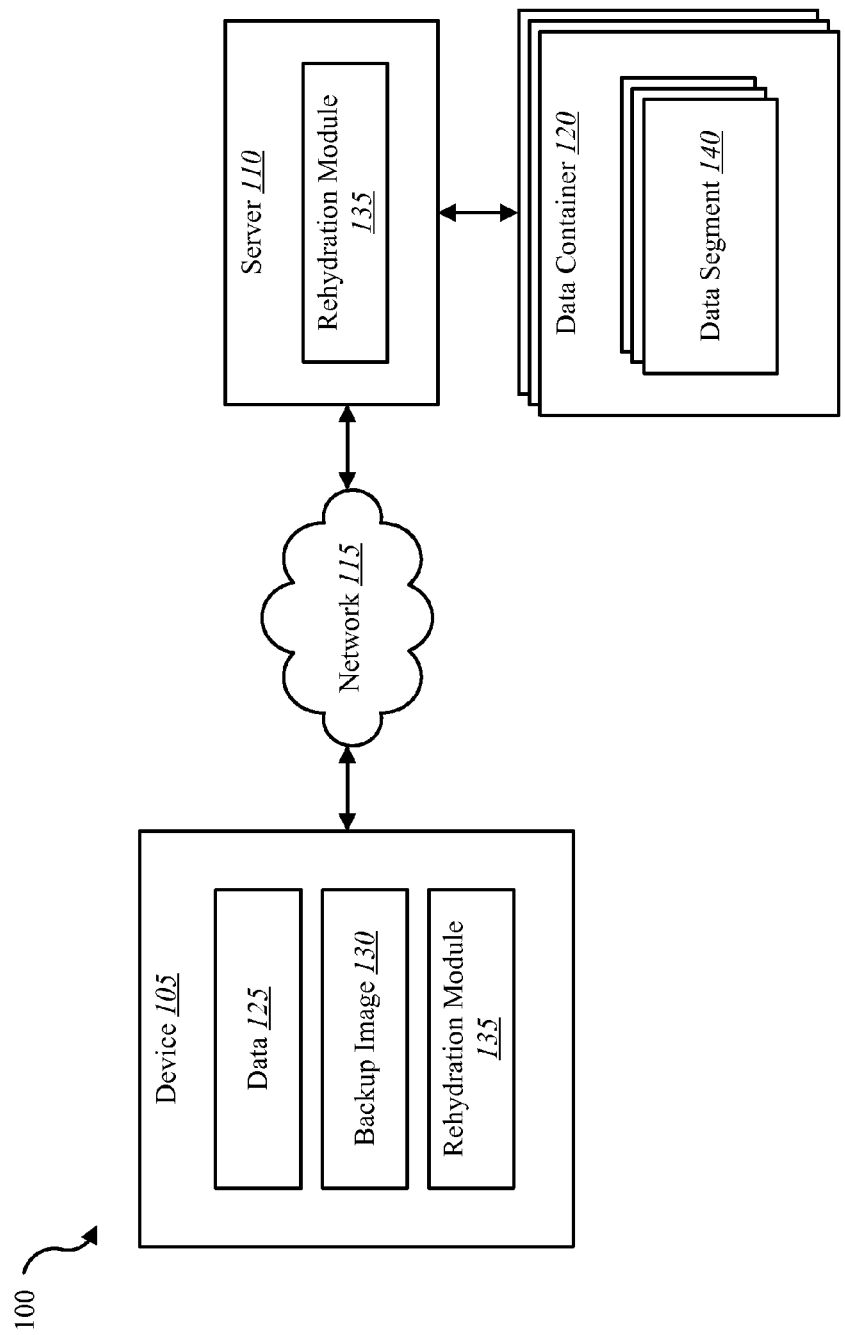
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to deduplication systems. More specifically, the systems and methods described herein relate to deduplication rehydration in relation to a data storage and recovery system.

A host machine may select a set of data to backup. A backup program may transfer the selected data over the Internet to a storage system. The selected data may be stored as a backup image. The backup image may be stored within the storage system in multiple data segments. The data segments may be deduplicated. In some cases, the data associated with the backup image may be updated on the host machine. Accordingly, the backup program may update the backup image by transferring to the storage system only those parts of data that represent the change to the original set of data. Thus, data segments that represent the change to the original set of data may be stored on the storage system. These data segments, however, may be stored apart from the data segments of the original set of data. Accordingly, with each change and update, additional fragmentation of data segments for the backup image may occur.

In some cases, deduplicate data may be rehydrated to a host machine, restoring a particular version of a backup image to the host machine. In some cases, deduplicate data may be rehydrated to tape for long-term or off-site storage. When the deduplicate data is copied to tape, the deduplicate data may be rehydrated, meaning the files are reassembled into their original form and are no longer deduplicated. Thus, rehydration refers to "un-deduplicating" a backup image. Rehydration may include copying deduplicate data (e.g., a deduplicated data segments of a backup image) from a storage device and reassembling the copied deduplicate data into a sequence and format that results in a version of the backup image in its original format.

When a request to rehydrate the backup image is received, each data segment of the backup image, including the update data segments, must be collected and arranged in an order that enables the restoration of the most recent version of the selected data, or portion thereof (e.g., the selected data may include multiple files and the restoration may pertain to a single file from these multiple files). In one embodiment, the data segments of the backup image may be read directly (e.g., self-read) from the one or more data containers holding these data segments. Additionally, or alternatively, the data segments may be prefetched ahead of time into a buffer and the backup image may be restored from the data segments copied into the buffer. Depending on the locality of the data segments, it may be more efficient to self-read a data segment or to prefetch a data segment. The locality of data segments is a measure of fragmentation of data segments. The data segments may be scattered across a data container and/or scattered across several data containers. Thus, locality may be determined by the location of one data segment in a data container in relation to one or more other data segments in the same data container, the location of one data segment of a first data container in relation to one or more other data segments stored in one or more other data containers, the number of data containers holding the data segments of the backup image, and so forth. In some cases, the most efficient manner of reading data segments may be to self-read some data segments and to prefetch others. Accordingly, the present systems and methods describe a method to determine whether to prefetch data segments. When the systems and methods determine to use prefetching, the present systems and methods determine which data segments to self-read and which data segments to prefetch.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, data container 120, and a network 115 that allows the device 105, data container 120, and the server 110 to communicate with one another.

Examples of the device 105 may include any combination of mobile devices, smart phones, personal computing devices, computers, laptops, desktops, servers, media content set top boxes, satellite set top boxes, cable set top boxes, DVRs, personal video recorders (PVRs), etc. In some cases, device 105 may include a building automation controller integrated within device 105, or as depicted, may be in communication with an automation controller via network 115.

In some configurations, the device 105 may include data 125, a backup image 130, and rehydration module 135. Although the components of the device 105 are depicted as being internal to the device 105, it is understood that one or more of the components may be external to the device 105 and connect to device 105 through wired and/or wireless connections.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include a rehydration module 135. In some embodiments, device 105 and server 110 may include a rehydration module 135 where at least a portion of the functions of rehydration module 135 are performed separately and/or concurrently on device 105 and/or server 110.

In some embodiments, server 110 may be coupled to one or more data containers (e.g., data container 120). Data container 120 may be internal or external to the server 110. Data container 120 may include a data storage device. Data container 120 may include a data container file. In some cases, data segment 140 is stored in a data container file. In one example, device 105 may be coupled directly to data container 120, data container 120 being internal or external to device 105. Data container 120 may include one or more data segments (e.g., data segment 140). In one example, rehydration module 135 may access data segment 140 in data container 120 over network 115 via server 110. Data segment 140 may be one portion of backup image 130. For example, backup image 130 may be transferred to an external storage device (e.g., a storage device of server 110). The backup image 130 may be divided into multiple data segments (e.g., data segment 140). Accordingly, a copy of backup image may be generated by assembling the data segments in a particular sequence. The data segments of backup image 130 may be saved in or more data containers 120. Thus, FIG. 1 depicts server 110 connected to multiple data containers and each data container may include one or more data segments. Thus, data container 120 may be one data container among several data containers that contain data segments of backup image 130. Data segment 140 may be one data segment of backup image 130. In some cases, a single data container may include all of the data segments of backup image 130. Thus, in one embodiment, data container 120 may include every data segment of backup image 130. Data segment 140 may be one of these data segments. Additionally, or alternatively, data container 120 may include data segments from backup images other than backup image 130.

Rehydration module 135 may enable efficient rehydration, or efficient restoration of backup images in a deduplication system. In some embodiments, rehydration module 135 may be configured to perform the systems and methods described herein in conjunction with data 125 and backup image 130. Data 125 may include one or more files and/or directories. In some cases, data 125 may include a database. In some embodiments, backup image 130 may include an image of data 125. The backup image 130 may span one or more computer files. Backup image 130 may include a backup of computer files containing the contents and structure of a disk volume or an entire data storage device, such as a hard drive, tape drive, floppy disk, a read-only memory chip, optical disc or USB flash drive. The backup image 130 may include a sector-by-sector copy of a source medium. The backup image 130 may replicate the structure and contents of a storage device independent of the file system. The backup image 130 may include a system image such as an exact copy of a drive. The backup image may include an image of one or more drives and include all the system settings, programs, and files needed for an operating system to function. It is noted, although backup image 130 is depicted as being on device 105, in some embodiments, backup image 130 may be on server 110. Thus, rehydration module 135 may generate a backup image (e.g., backup image 130) of data 125. Rehydration module 135 may store the backup image 130 on a remote storage device. For example, rehydration module 135 may store backup image 130 in one or more data containers of server 110 (e.g., data container 120). Rehydration module 135 may store backup image 130 as data segments in one or more data containers. Thus, in one embodiment, backup image 130 may be divided into several data segments, data segment 140 being one of those data segments. The data segments of backup image 130 may be stored on one or more data containers, thus, data container 120 may be one of these one or more data containers. As data 125 is modified and updated on device 125, then these changes may be stored as additional data segments. Thus, when rehydration module 135 sends a command to restore backup image 130 (e.g., because data 125 was corrupted, a storage device on device 105 failed, writing backup image 130 to tape, etc.), each of the original data segments and each subsequent data segment added to the original due to updates and modifications to data 125 may be collected, sorted, and arranged in a sequence that represents the most recent state of data 125. The performance and latency involved in the collection and arrangement of these data segments depends on the location of each data segment with respect to each other data segment. Thus, rehydration module 135 improves the rehydration of backup images by determining the relative location of each data segment and determining whether to prefetch data segments and determining which data segments to prefetch and which data segments to read directly (self-read) from a data container. Further details regarding the rehydration module 135 are discussed below.

Figure 2:
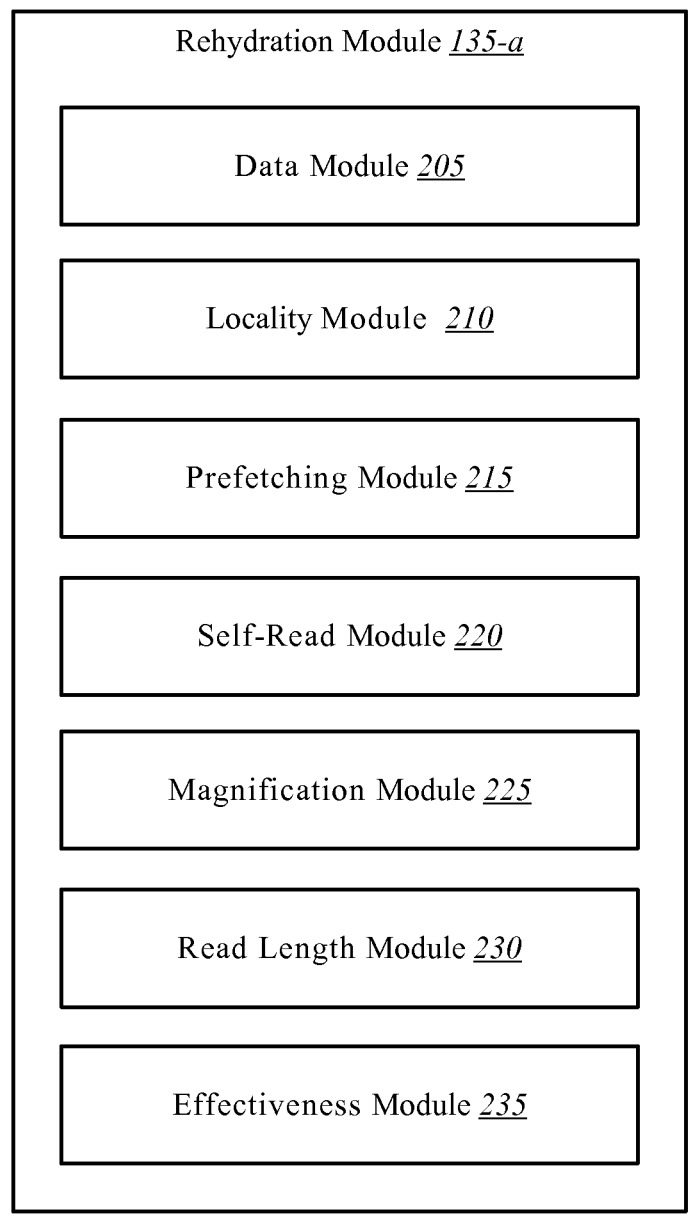
FIG. 2 is a block diagram illustrating one example of a rehydration module.

FIG. 2 is a block diagram illustrating one example of a rehydration module 135-*a*. Rehydration module 135-*a* may be one example of rehydration module 135 depicted in FIG. 1. As depicted, rehydration module 135-*a* may include data module 205, a locality module 210, a prefetching module 215, a self-read module 220, a magnification module 225, a read length module 230, and an effectiveness module 235.

In one embodiment, rehydration module 135-*a* may receiving a request to restore a backup image (e.g., backup image 130 of FIG. 1). The backup image may be stored in a deduplication system (e.g., server 110). In some cases, the backup image may be divided into and stored as multiple data segments (e.g., data segment 140). Locality module 210 may determine locality information for at least one of the plurality of data segments. The locality information may include information regarding a location of the at least one data segment in relation to each other data segment of the backup image. For example, the data segments of one backup image may be stored in a sequence with data segments from one or more other backup images. The data segments of one backup image may be stored across multiple data containers (e.g., data container 120).

In one embodiment, data module 205 may obtain an identifier of each data container that stores the data segments of the requested backup image, the backup image requested to be rehydrated. Based on one or more determinations, prefetching module 215 may determine whether to prefetch data segments of the requested backup image. Upon determining to prefetch data segments of the requested backup image, prefetching module 215 may determine a degree to which the data segments of the backup image are processed by prefetching. For example, prefetching module 215 may determine to prefetch 30% of all the data segments of the requested backup image.

In some embodiments, prefetching module 215 may calculate a prefetch ratio based on a complementary percentage of a value of a predetermined self-read ratio. A complementary percentage may be derived from subtraction of a known percentage from 100%. If 25% were the known percentage, then the complementary percentage would be 75% (e.g., 100%-25%=75%). Or if 83.125% were the known percentage, then 16.875% would be the complementary percentage (e.g., 100%-83.125%=16.875%). The prefetch ratio may express the degree to which the plurality of data segments of the backup image are processed by prefetching. If a self-read ratio is predetermined to be 60%, then the prefetch ratio is calculated to be 40% (e.g., 100%-60%=40%), meaning 60% of the data segments of a backup image requested to be restored are self-read (e.g., read directly without prefetching them into a buffer), and 40% of those data segments are prefetched.

In one embodiment, data module 205 may calculate a data segment sum. Calculating the data segment sum may include summing a number of data segments in the backup image with a number of data segments currently being prefetched by all prefetch threads. Rehydration module 135-*a* may execute multiple prefetch threads, each thread running in parallel with other prefetch threads. Several prefetch threads may be running and/or preparing to run simultaneously in response to multiple restore requests. For example, first prefetch thread may be executed to locate and prefetch data segments of a first backup image in response to a request to restore the first backup image, while a second prefetch thread may be executed to locate and prefetch data segments from a second backup image in response to a request to restore the second backup image. Likewise, two or more prefetch threads may be executed to locate and prefetch data segments from a single backup image while additional prefetch threads are simultaneously executing and/or preparing to execute to locate and prefetch data segments for requests to restore one or more other backup images. Thus, the data segment sum may represent the total number of data segments currently being prefetched and/or currently marked for prefetching.

In one embodiment, data module 205 may calculate a data container sum. As described above, data segments from the requested backup image may be stored in one or more data container files. Data segments from one or more different backup images may be stored in one or more data container files as well, including the same one or more data container files storing the data segments of the requested backup image. Accordingly, data module 205 may calculate the data container sum by summing a number of unique data container files containing the plurality of data segments in the requested backup image with a number of unique data container files containing the data segments currently being prefetched by all prefetch threads.

In some embodiments, locality module 210 may calculate a merged locality. Calculating the merged locality may include determining a ratio of the data segment sum to the data container sum. If the merged locality satisfies a predetermined high-locality threshold, then self-read module 220 may set a self-read ratio of the request to restore a backup image to 100 percent. The self-read ratio may express the degree to which the data segments of the requested backup image are processed without prefetching. Thus, if the self-read-ratio is set to 100%, then 0% of the data segments of the requested backup image are prefetched, and 100% of these data segments are read directly from the data container files.

In one embodiment, if the merged locality satisfies a predetermined low-locality threshold and fails to satisfy a predetermined high-locality threshold, then magnification module 225 may calculate a magnification factor based on a ratio of merged locality to the low-locality threshold (e.g., magnification factor=merged locality/low-locality threshold). Self-read module 220 may calculate a self-read ratio based on a product of the magnification factor and a predetermined self-read-ratio baseline value (e.g., self-read-ratio=(magnification factor)*(self-read-ratio baseline).

In one embodiment, if the merged locality fails to satisfy both a predetermined low-locality threshold and a predetermined high-locality threshold, then magnification module 225 may calculate a magnification factor based on a ratio of the low-locality threshold to merged locality (e.g., magnification factor=low-locality threshold/merged locality). Self-read module 220 may calculate a self-read ratio based on a complementary percentage of a product of the magnification factor and a complementary percentage of a predetermined self-read ratio-baseline value. For example, self-read-ratio=1−((magnification factor)*(1−self-read-ratio baseline)).

Those data segments selected for prefetching may be referred to as target data segments. In some embodiments, upon determining to prefetch data segments, prefetching module 215 may prefetch one or more of the target data segments from a data container based at least in part on a predetermined effectiveness threshold. It is noted that data module 205 may determine a value for at least one of a low-locality threshold, a high-locality threshold, a self-read-ratio baseline, and an effectiveness threshold based at least in part on analyzing system parameters and accessing previous test data.

In one embodiment, read length module 230 may determine a maximum read length. The maximum read length may be based on an allocated memory size for a temporary buffer. In some cases, the data module 205 may select a data container, the data container containing one or more target data segments from the backup image. The read length module 230 may iteratively determine length values for a consecutive sequence of one or more data segments in the data container. A first iteration may include determining a length of a first target data segment in the data container. A next iteration may add a data segment directly adjacent to the first target data segment and determining a length of these two data segments. The second data segment, in some cases, may be another target data segment. Thus, read length module 230 may add at least one sequential data segment to a current length of the one or more data segments for each subsequent iteration and determine a length of each subsequent iteration. In some cases, read length module 230 may determine only the length of the target data segments in each subsequent iteration. Thus, each determined read length of each iteration may indicate the length of all target data segments in each iteration. Read length module 230 may stop the iterative determination of length values when a current length value exceeds the maximum read length and/or the current length of the one or more data segments includes all target data segments in the data container.

In one embodiment, read length module 230 may save the determined length values in an array of length values for each length value that does not exceed a determined length value of a final iteration. Data module 205 may analyze the one or more data segments within each consecutive sequence of one or more data segments from the final iteration length value (e.g., the longest length value) to the shortest length value (e.g., the first target data segment alone). The analyzing the one or more data segments may include determining a number of target data segments included within each consecutive sequence of one or more data segments.

In some embodiments, effectiveness module 235 may determine an effectiveness ratio for each consecutive sequence of one or more data segments. The effectiveness ratio may include a ratio of a length of the one or more target data segments within a first consecutive sequence of one or more data segments to a length value of the first consecutive sequence of one or more data segments. If the effectiveness ratio of an analyzed length satisfies an effectiveness threshold and the effectiveness ratio of the analyzed length is the largest of the effectiveness ratios in the array of length values, then effectiveness module 235 may select the analyzed length as the length to use in prefetching those data segments. In one embodiment, data module 205 may read all of the data segments from the analyzed length into a temporary buffer. Data module 205 may read target data segments in the temporary buffer into a shared buffer. The shared buffer may include each of the data segments of the backup image, both the target data segments as well as the self-read data segments read directly. In some cases, the shared buffer may contain only the target data segments. Thus, in any case, the data segments in the shared buffer may be combined by a restore thread to rehydrate the requested backup image.

Figure 3:
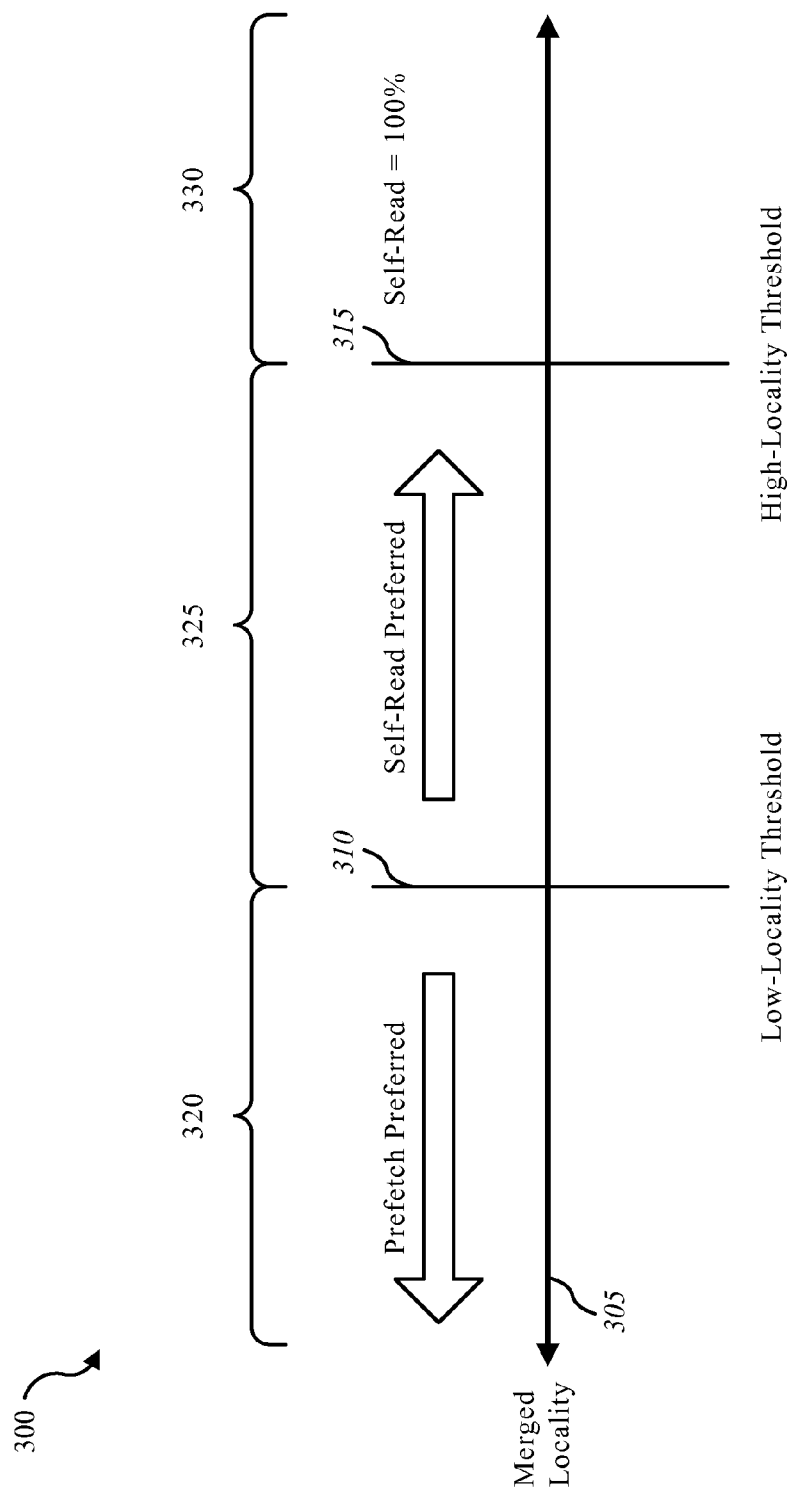
FIG. 3 is a diagram illustrating one example of a graph.

FIG. 3 is a diagram illustrating one example of a graph 300. As depicted, graph 300 indicates values of a calculated merged locality along a merged locality line 305 in relation to a low-locality threshold 310 and a high-locality threshold 315. In some configurations, features related to the graph 300 may be implemented in conjunction with the rehydration module 135 illustrated in FIGS. 1 and/or 2.

As explained above, the rehydration module 135 determines whether to prefetch data segments, and upon determining to prefetch data segments, determines which data segments to prefetch and which data segments to read directly (self-read). When the rehydration module 135 determines merged locality to be above the high-locality threshold 315 (e.g., in first region 330), the rehydration module 135 may set the self-read-ratio to 100%, meaning that each data segment of the backup image being restored is read directly from the one or more data containers holding each data segment. Thus, in this case, the prefetch ratio would be set to 0%, meaning no data segment of the requested backup image is prefetched or buffered ahead of time. When the rehydration module 135 determines merged locality to be above the low-locality threshold 310 and above the high-locality threshold 315 (e.g., in second region 325), the rehydration module 135 may calculate the self-read-ratio based on the value of merged locality. When the rehydration module 135 determines merged locality to be below both the low-locality threshold 310 and the high-locality threshold 315 (e.g., in third region 320), the rehydration module 135 may calculate the self-read-ratio based on the value of merged locality.

A batch of segment read requests from a client may be handled by a restore thread within a deduplication engine. The location information (e.g., identifier of a container storing data segments and the segment offset within the container) of the requested batch of segments is analyzed by one of prefetch threads and proper read-ahead prefetching strategy may be applied to prefetch segments into common memory pool, which may be pre-allocated on demand and may be shared by multiple involved concurrent restore threads (i.e., self-read threads) and prefetch threads.

Rehydration module 135 may improve the response time, minimize read latency, and overall rehydration throughput, by performing certain functions on the fly, in real time. Rehydration module 135 may determine a prefetch boundary, designating which segments to read by the restore thread itself and which segments should be handled by the prefetch threads. Rehydration module 135 may determine a prefetch efficiency, determining the manner in which segments are prefetched based on their known location information.

Rehydration module 135 may calculate a prefetching percentage for a batch of data segment requests according to a merged locality. The merged locality may be calculated based on a locality of data segments presently being prefetched and the locality of data segments of the requested backup image. For batches with relatively high locality and low fragmentation, a self-read policy may be preferred. For batches with low locality and high fragmentation, a policy of prefetch may be preferred. After prefetching percentage is calculated, restore threads may notify prefetch threads to prefetch data segments in the prefetching partition, and the remaining portion of data segments may be read directly.

Calculating a prefetching percentage based on locality includes the advantages of processing self-reads and prefetch reads in parallel. For example, a restore thread may make use of prefetch's preparation time to read segments directly (e.g., self-read data segments directly while a prefetching thread prepares to prefetch target data segments), leaving more time for prefetch threads to read segments sequentially from a data container and decreasing any read/write conflicts on a shared buffer, into which more expected segments may be put. Another advantage may include decreased instances of duplicate reading where the same segments are read between restore and prefetch threads. If expected data segments to be prefetched are not found in shared memory buffer, restore threads read them from disk directly, otherwise restore threads just copy the expected data segments from the shared buffer.

In some embodiments, a prefetching percentage for a batch of segments requests may be calculated from a calculated value of merged locality. Merged locality may be calculated based on the total number of data segments being requested (Sp), the number of a current batch of prefetched data segments (Sb), the total number of data containers (Dp), and the number of data containers of the current batch (Db). Accordingly, merged locality (ML) may be calculated based on calculating merged locality as ML=(Sp+Sb)/(Dp+Db). Referring to FIG. 3, if (ML>=High-Locality Threshold), then self read ratio=1.0 (e.g., 100%). Else, if (ML>=Low-Locality Threshold) and (ML<High-Locality Threshold), then magnification factor=ML/Low-LocalityThreshold; and self read ratio=magnification factor*self read ratio baseline. Else, magnification factor=Low-LocalityThreshold/ML; and self read ratio=(1−magnification factor)*(1−self read ratio baseline). The prefetch ratio may be calculated as prefetch ratio=1.0−self read ratio. Accordingly, the workload of restore threads and prefetch threads may be balanced, cache hit ratios may be improved, disk input/output may be made full use of, and a throughput of the deduplication system may be improved.

Figure 4:
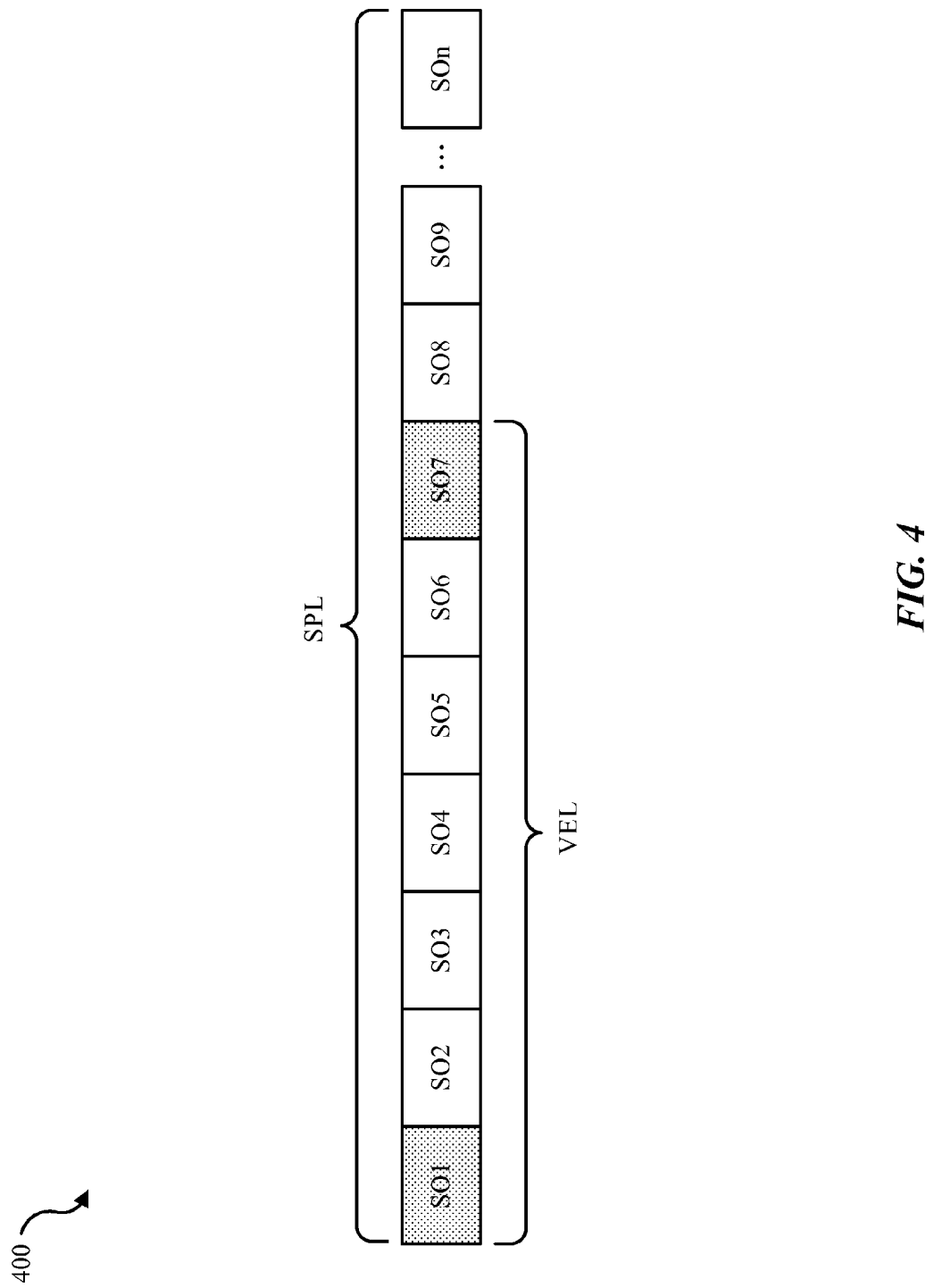
FIG. 4 is a block diagram illustrating one example of a sequence of data segments.

FIG. 4 is a block diagram illustrating one example of a sequence of data segments 400. It is noted that data segments may be referred to as data objects. As depicted, sequence 400 includes a sequence of segment objects (e.g., SO1, SO2, etc.). FIG. 4 depicts SO1 and SO7 as target segment objects (i.e., target data segments). In some configurations, features related to sequence 400 may be implemented in conjunction with the rehydration module 135 illustrated in FIGS. 1 and/or 2.

Reading a segment object may include a disk seek (e.g., 5-10 ms) followed by a segment read. If requested segments are scattered within a data container (low locality, high fragmentation), the disk seek and short random read may cause poor prefetch and rehydration performance. Upon receiving a request to restore a backup image, the segment objects of the requested backup image may be located. As explained above, the backup image may be restored by placing the segments in an arranged sequence. Accordingly, the segments may be sorted according to their location in this arranged sequence. In the present systems and methods, after segments are located based on an offset in the data container and are sorted according to this arranged sequence, prefetch threads may read certain segments from the data containers into an internal temporary buffer. As illustrated in FIG. 4, target segments SO1 and SO7 may be read from sequence 400 in a read operation. Moreover, segments SO2-SO6 may be read in the same read operation as SO1 and SO7, even though SO2-SO6 are not target segments. Doing so, however, may remove unnecessary seek times between different target segments within a data container. Furthermore, a variable effective length (VEL) and a stable physical length (SPL) may be defined for a prefetching thread's specific internal temporary buffer. In some cases, VEL may be less than or equal to SPL. SPL may be set equal to an internal temporary buffer's memory allocation size. VEL may be calculated on the fly, in real-time, to cover each possible combination of target data segments within a given sequence of data segments such as sequence 400 in order to reduce the number of seek/read operations and improve rehydration operation times and latency.

As depicted in FIG. 4, upon calculating VEL, the prefetching thread may read data with the designated length of VEL (from SO1's start offset to the end offset of SO7) into a temporary buffer. Only the target segments, SO1 and SO7, may then be copied into a shared buffer. The restore thread may build the backup image using the target segments in the shared buffer.

The rehydration module 135 may calculate VEL by iterating length values of internal_temporary_buffer from a first SO length (e.g., SO1 alone) up to the full SPL length. The total length of SOs per iteration and/or the length of target SOs in each iterated length may be calculated. These lengths may be saved in a count array (e.g., count_array). Upon iterating each length up to SPL, the rehydration module 135 may iterate count_array from SPL down to the first SO's length (e.g., SO1 alone). For each length, rehydration module 135 may calculate an effectiveness ratio based on effectiveness_ratio=target_SOs_total_length/current_length_value. If the calculated effectiveness ratio is calculated to be greater than or equal to a predetermined effectiveness ratio, and the calculated effectiveness_ratio is the largest effectiveness_ratio calculated up to that point among the iterated lengths of count_array, then VEL is set to that current length value. Accordingly, as depicted in FIG. 4, assuming the configuration of an effectiveness ratio of 2/8, to read only SO1 and SO7 from a data container, VEL= (SO7's end_offset−SO1's start offset). This length is selected because it has the biggest effectiveness ratio (e.g., 2/7) where two target SOs are found among the seven SOs, and because the effectiveness ratio of 2/7 is greater than the preconfigured effectiveness threshold of 2/8, thus covering as many SOs as possible within the sequence.

The rehydration module 135 iterates count_array from SPL down to the first SO's length because were count_array to be iterated from the first SO upwards, then the candidate with the highest ratio would always be 1/1, because it is the largest ratio that satisfies the effectiveness ratio threshold, which is 2/8 in this example. As an example, if the data segment 400 included three target segments within 13 consecutive SOs the third target segment being in the 13th SO (e.g., SO13), then the first effectiveness ratio may be 3/13, 3 target SOs in a total 13 consecutive SOs in a data container. The ratio 3/13, however, would not satisfy the effectiveness threshold of 2/8. So, moving backwards in count_array, the next effectiveness ratios may be 2/12, 2/11, 2/10, 2/9, 2/8, and 2/7, 1/6, 1/5, 1/4, 1/3, 1/2, 1/1. The ratio with the most target SOs that satisfies the 2/8 threshold would be 2/7. Thus, rehydration module 135 reads a VEL length of 7*SO_length (assuming each SO is of equal length in data segment 400).

Figure 5:
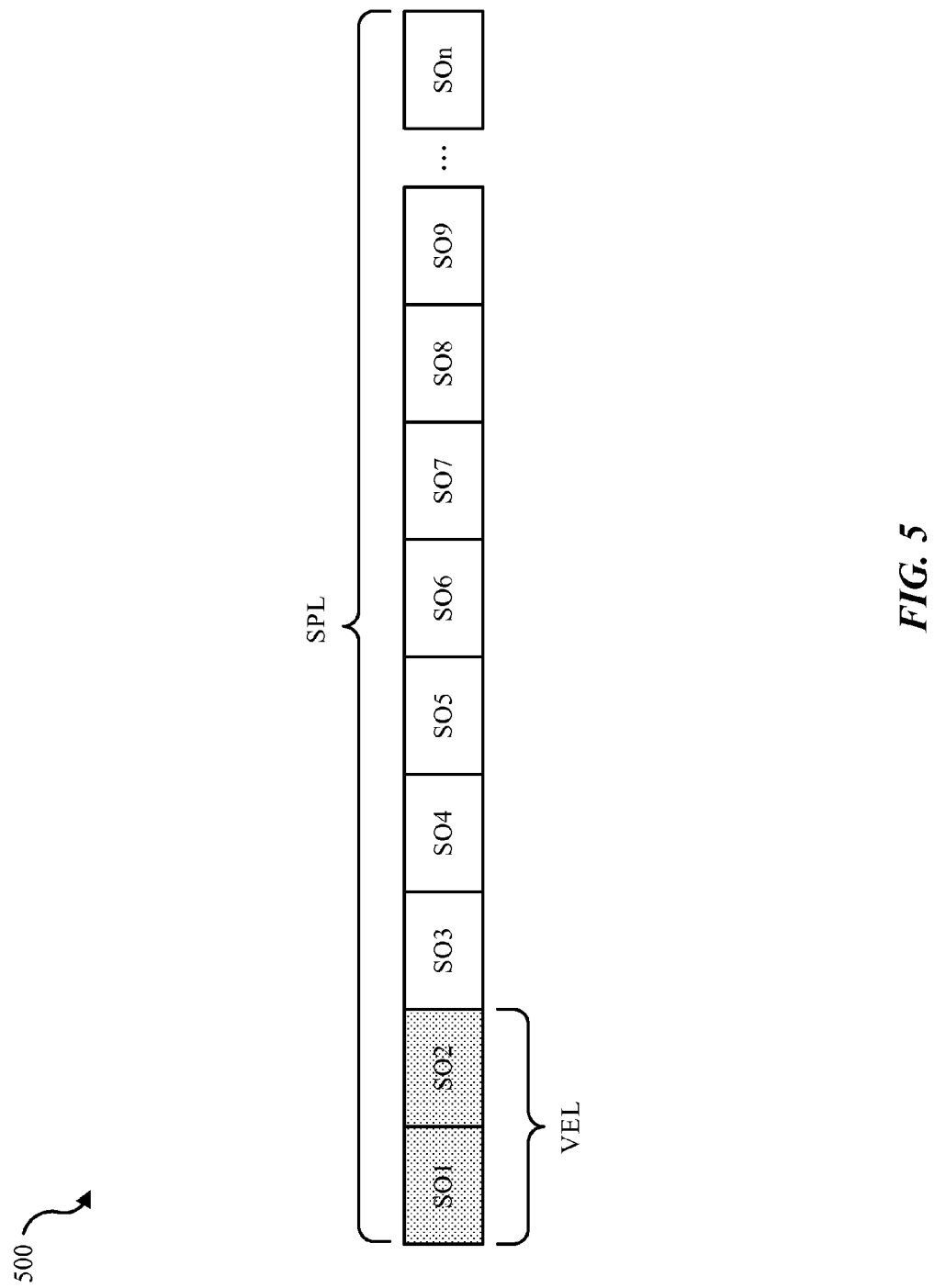
FIG. 5 is a block diagram illustrating one example of a sequence of data segments.

FIG. 5 is a block diagram illustrating one example of a sequence of data segments 500. As depicted, sequence 500 includes a sequence of segment objects similar to sequence 400. FIG. 5 depicts SO1 and SO2 as target segment objects. In some configurations, features related to sequence 500 may be implemented in conjunction with the rehydration module 135 illustrated in FIGS. 1 and/or 2.

As described above, the rehydration module 135 determines the length of SO1, then SO1 and SO2, then SO1-SO3, and so forth, up to SPL. These lengths may be saved in a count array (e.g., count_array). In some cases, a determined length may include a length of only target segments within the analyzed length. Upon iterating each length up to SPL, the rehydration module 135 may iterate count_array from SPL down to the first SO's length (e.g., SO1 alone). For each length, rehydration module 135 may calculate an effectiveness ratio based on effectiveness_ratio=target_SOs_total_length/current_length_value. To read only SO1 and SO2 from the data container, VEL is calculated to be equal to (SO2's end_offset−SO1's start offset). This is because at this length, VEL has the largest possible effectiveness ratio (2/2) of each possible length, because this length is greater than or equal to the configured effectiveness threshold (e.g., 2/8), and because this length covers all of the possible SOs up to SPL.

Figure 6:
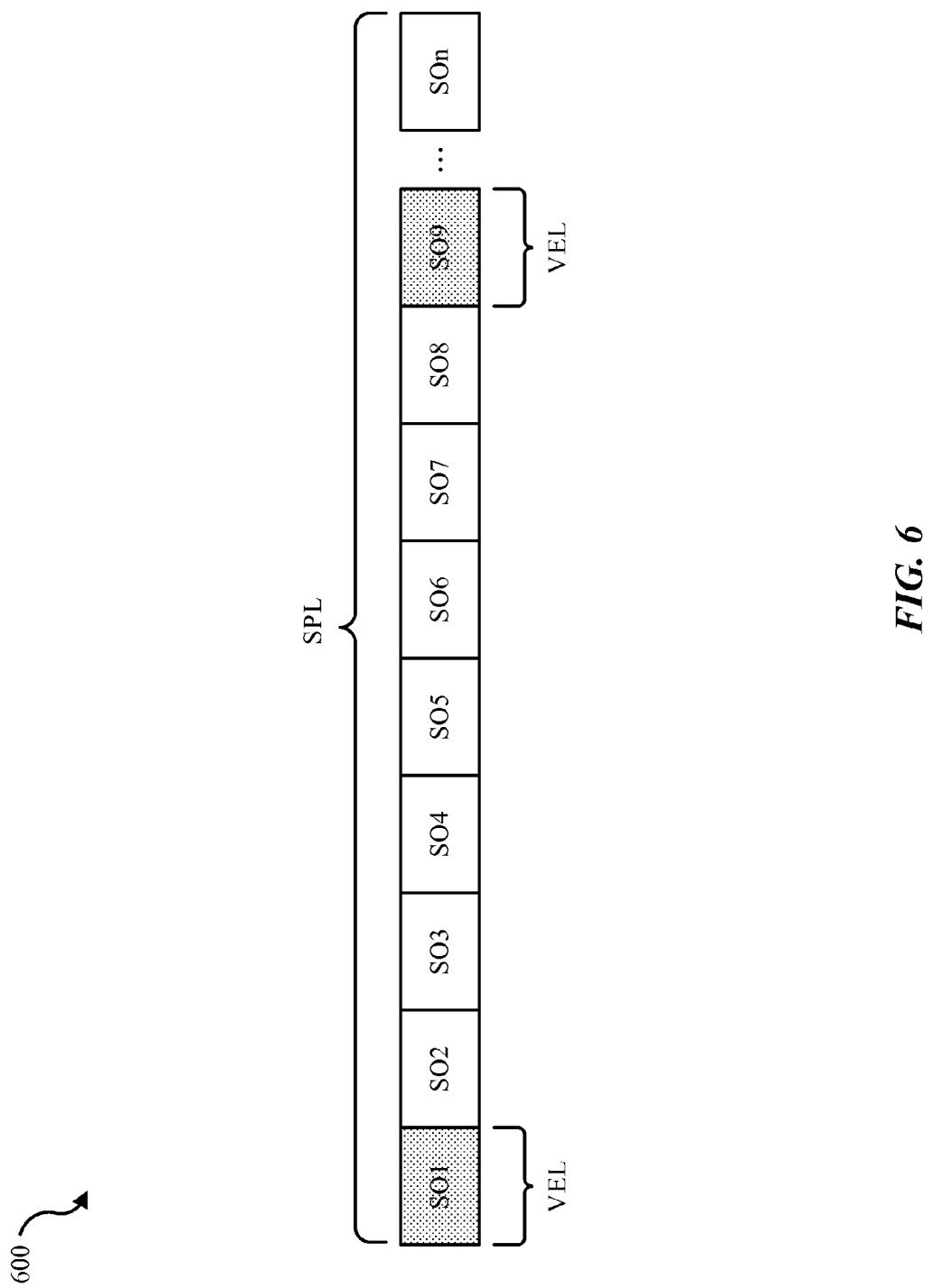
FIG. 6 is a block diagram illustrating one example of a sequence of data segments.

FIG. 6 is a block diagram illustrating one example of a sequence of data segments 600. Data segments may be referred to as data objects. As depicted, sequence 600 includes a sequence of segment objects similar to sequence 400 and/or 500. FIG. 6 depicts SO1 and SO9 as target segment objects. In some configurations, features related to sequence 600 may be implemented in conjunction with the rehydration module 135 illustrated in FIGS. 1 and/or 2.

As shown in FIG. 6, to read only SO1 and SO9 from a data container based on the configured effectiveness threshold of 2/8, a first VEL is set equal to the length of SO1 and a second VEL is set equal to the length of SO9. This is because if SO9 is read at same time as SO1, then the effectiveness ratio 2/9 is less than the configured effectiveness threshold of 2/8. Accordingly, after the rehydration module 135 reads SO1, the rehydration module 135 seeks to SO9's start offset and reads SO9 with the second VEL set equal to SO9's length.

Figure 7:
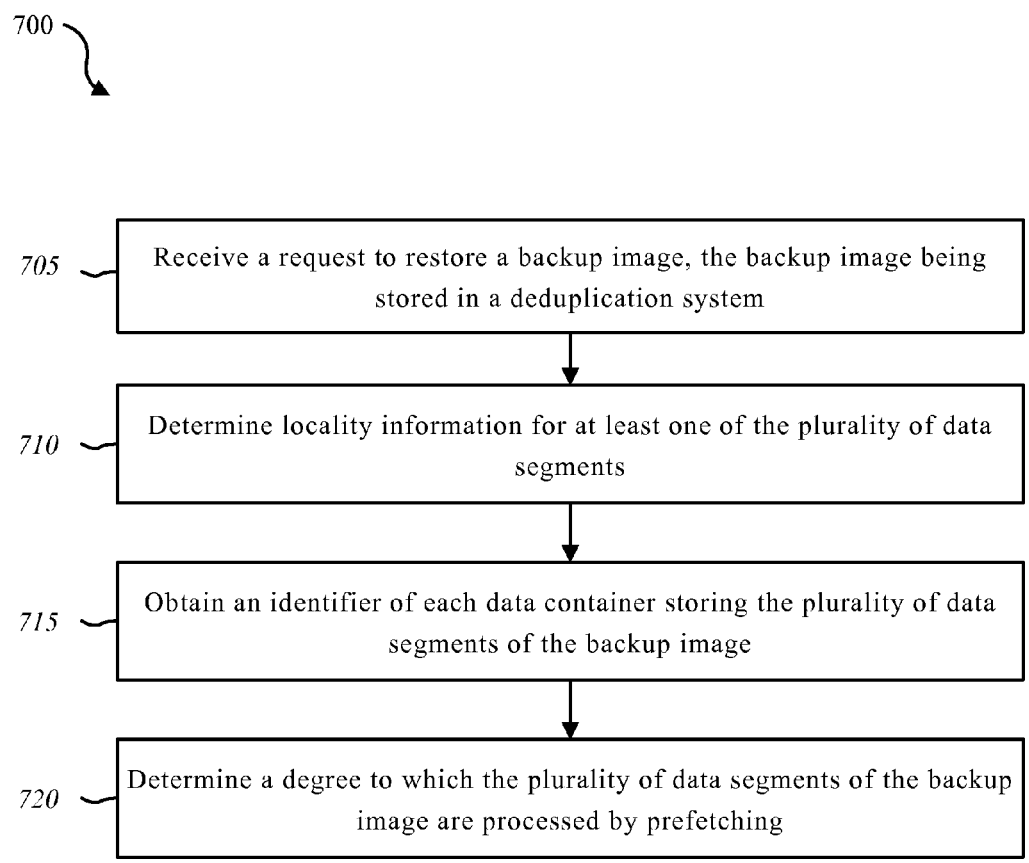
FIG. 7 is a flow diagram illustrating one embodiment of a method for deduplication rehydration.

FIG. 7 is a flow diagram illustrating one embodiment of a method 700 for deduplication rehydration. In some configurations, features related to the method 700 may be implemented in conjunction with the rehydration module 135 illustrated in FIGS. 1 and/or 2.

At block 705, a request to restore a backup image may be received. The backup image may be stored in a deduplication system. The backup image may include a plurality of data segments. At block 710, locality information may be determined for at least one of the plurality of data segments. In some cases, the locality information may include information regarding a location of the at least one data segment in relation to each other data segment of the plurality of data segments in the backup image. At block 715, an identifier of each data container storing the plurality of data segments of the backup image may be obtained. At block 720, a degree to which the plurality of data segments of the backup image are processed by prefetching may be determined.

Figure 8:
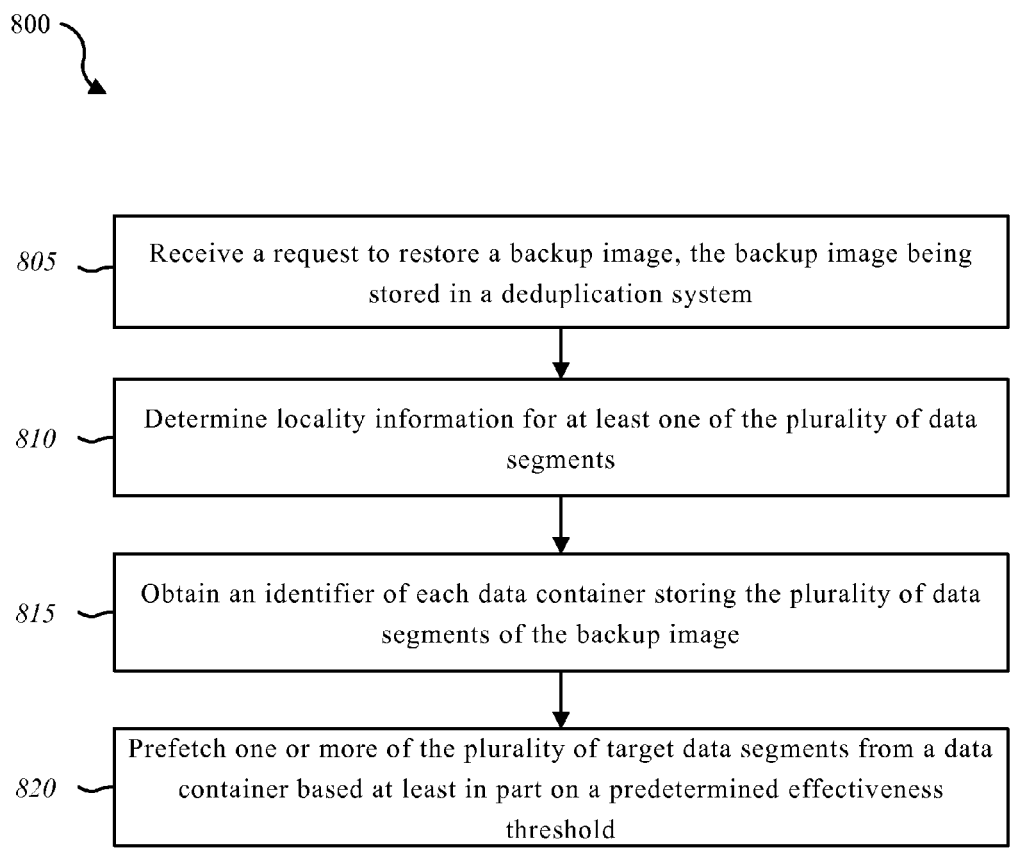
FIG. 8 is a flow diagram illustrating one embodiment of a method for deduplication rehydration.

FIG. 8 is a flow diagram illustrating one embodiment of a method 800 for deduplication rehydration. In some configurations, the method 800 may be implemented by the rehydration module 135 illustrated in FIG. 1 or 2.

At block 805, a request to restore a backup image may be received. The backup image may be stored in a deduplication system. The backup image may include a plurality of data segments. At block 810, may be determined locality information for at least one of the plurality of data segments. The locality information may include information regarding a location of the at least one data segment in relation to each other data segment of the plurality of data segments in the backup image. At block 815, an identifier of each data container storing the plurality of data segments of the backup image may be obtained. At block 820, one or more of the plurality of target data segments may be prefetched from a data container based at least in part on a predetermined effectiveness threshold.

Figure 9:
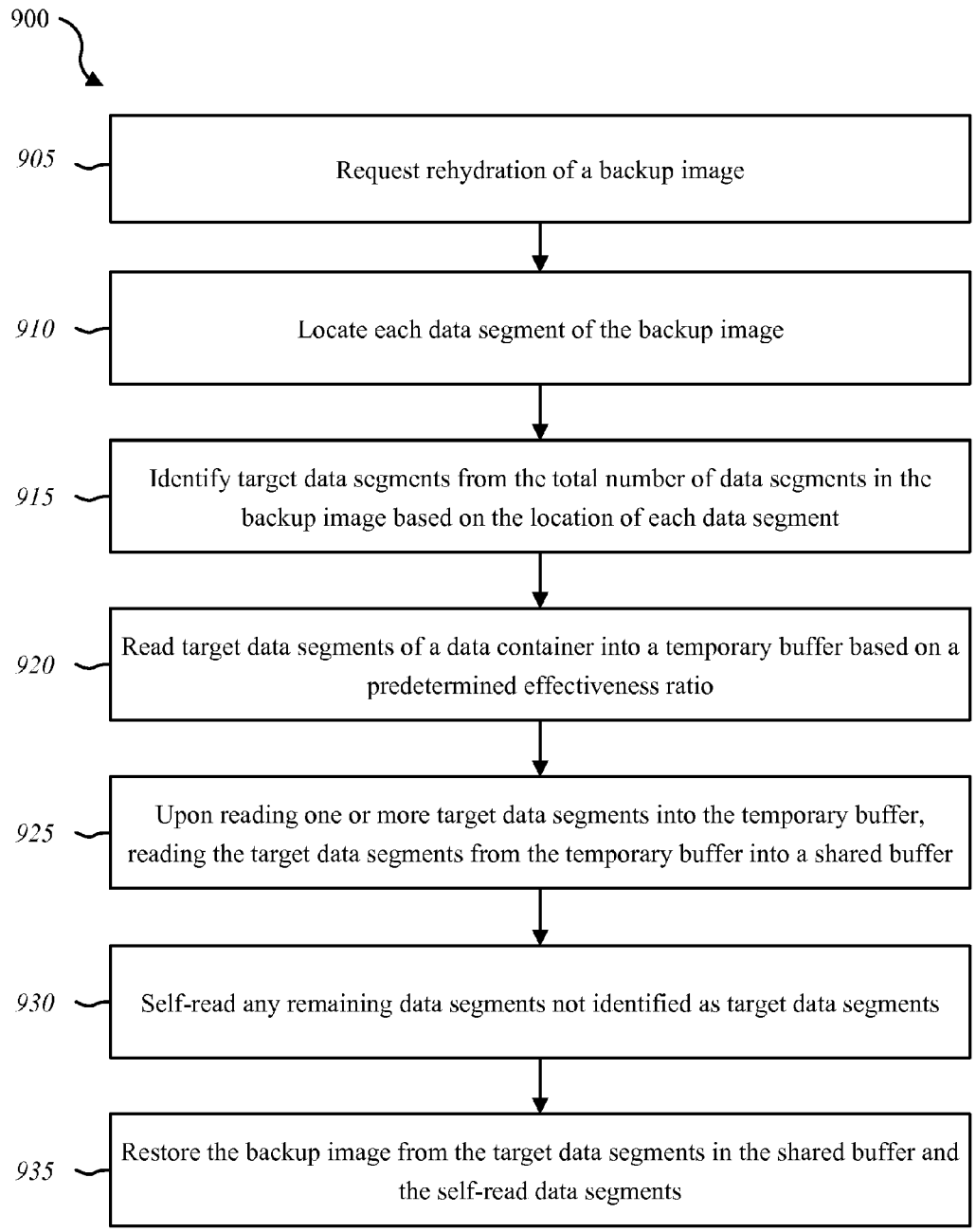
FIG. 9 is a flow diagram illustrating one embodiment of a method for deduplication rehydration.

FIG. 9 is a flow diagram illustrating one embodiment of a method 900 for deduplication rehydration. In some configurations, the method 900 may be implemented by the rehydration module 135 illustrated in FIG. 1 or 2.

At block 905, rehydration of a backup image may be requested. At block 910, each data segment of the backup image may be located. At block 915, target data segments from the total number of data segments in the backup image may be identified based on the location of each data segment. The target data segments may be targeted for a prefetching routine, where the prefetching routine includes reading data segments into a buffer before restoring the backup image from the total number of data segments in the backup image. At block 920, target data segments of a data container may be read into a temporary buffer based on a predetermined effectiveness ratio. The manner of reading each target data segment may be determined by the predetermined effectiveness ratio. Determining the manner of reading target data segments may include at least one of determining a number of target data segments in a data container, determining a number of target data segments to read in a single read operation, determining an order in which target data segments are read, identifying sequences of target data segments, etc. At block 925, upon reading one or more target data segments into the temporary buffer, the target data segments may be read from the temporary buffer into a shared buffer. Additionally, or alternatively, in some embodiments, the self-read data segments may be read into the shared buffer. At block 930, any remaining data segments not identified as target data segments may be self-read. Self-reading may refer to the data segments of the backup image being read directly from the one or more data containers holding these remaining data segments. At block 935, the backup image may be restored from the target data segments in the shared buffer and the self-read data segments.

Figure 10:
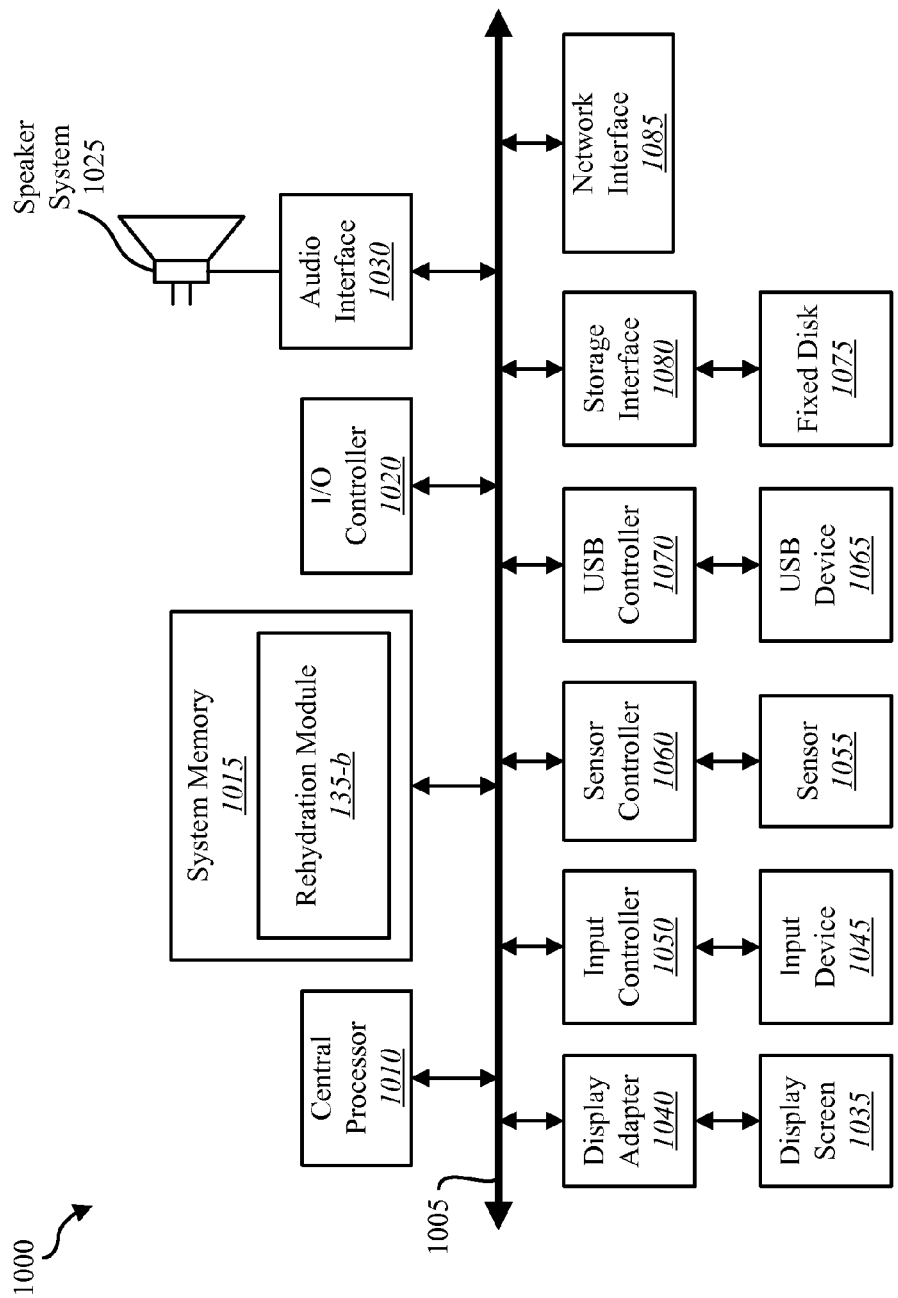
FIG. 10 depicts a block diagram of a computer system suitable for implementing the present systems and methods.

FIG. 10 depicts a block diagram of a controller 1000 suitable for implementing the present systems and methods. The controller 1000 may be an example of device 105 and/or server 110 illustrated in FIG. 1. In one configuration, controller 1000 includes a bus 1005 which interconnects major subsystems of controller 1000, such as a central processor 1010, a system memory 1015 (typically RAM, but which may also include ROM, flash RAM, or the like), an input/output controller 1020, an external audio device, such as a speaker system 1025 via an audio output interface 1030, an external device, such as a display screen 1035 via display adapter 1040, an input device 1045 (e.g., remote control device interfaced with an input controller 1050), multiple USB devices 1065 (interfaced with a USB controller 1070), and a storage interface 1080. Also included are at least one sensor 1055 connected to bus 1005 through a sensor controller 1060 and a network interface 1085 (coupled directly to bus 1005).

Bus 1005 allows data communication between central processor 1010 and system memory 1015, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the rehydration module 135-*b* to implement the present systems and methods may be stored within the system memory 1015. Applications resident with controller 1000 are generally stored on and accessed via a non-transitory computer readable medium, such as a hard disk drive (e.g., fixed disk 1075) or other storage medium. Additionally, applications can be in the form of electronic signals modulated in accordance with the application and data communication technology when accessed via interface 1085.

Storage interface 1080, as with the other storage interfaces of controller 1000, can connect to a standard computer readable medium for storage and/or retrieval of information, such as a fixed disk drive 1075. Fixed disk drive 1075 may be a part of controller 1000 or may be separate and accessed through other interface systems. Network interface 1085 may provide a direct connection to a remote server via a direct network link to the Internet via a POP (point of presence). Network interface 1085 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1000 wirelessly via network interface 1085.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 10 need not be present to practice the present systems and methods. The devices and subsystems can be interconnected in different ways from that shown in FIG. 10. The aspect of some operations of a system such as that shown in FIG. 10 are readily known in the art and are not discussed in detail in this application. Code to implement the present disclosure can be stored in a non-transitory computer-readable medium such as one or more of system memory 1015 or fixed disk 1075. The operating system provided on controller 1000 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for deduplication rehydration, comprising:
   receiving a request to restore a backup image, the backup image being stored in a deduplication system, wherein the backup image comprises a plurality of data segments;
   determining locality information for at least one of the plurality of data segments, wherein the locality information comprises information regarding a location of the at least one data segment in relation to each other data segment of the plurality of data segments in the backup image;
   obtaining an identifier of each data container storing the plurality of data segments of the backup image; and
   determining a degree to which the plurality of data segments of the backup image are processed by prefetching.

2. The method of claim 1, further comprising:
   calculating a prefetch ratio based on a complementary percentage of a value of a predetermined self-read ratio, the prefetch ratio expressing the degree to which the plurality of data segments of the backup image are processed by prefetching.

3. The method of claim 1, further comprising:
   calculating a data segment sum, wherein calculating the data segment sum comprises summing a number of data segments in the backup image with a number of data segments currently being prefetched by all prefetch threads.

4. The method of claim 3, further comprising:
   calculating a data container sum, wherein calculating the data container sum comprises summing a number of unique data container files containing the plurality of data segments in the backup image with a number of unique data container files containing the data segments currently being prefetched by all prefetch threads.

5. The method of claim 4, further comprising:
   calculating a merged locality, wherein calculating the merged locality comprises determining a ratio of the data segment sum to the data container sum.

6. The method of claim 5, further comprising:
   if merged locality satisfies a predetermined high-locality threshold, then setting a self-read ratio of the request to restore a backup image to 100 percent, the self-read ratio expressing the degree to which the plurality of data segments of the backup image are processed without prefetching.

7. The method of claim 5, further comprising:
   if merged locality satisfies a predetermined low-locality threshold and fails to satisfy a predetermined high-locality threshold, then calculating a magnification factor based on a ratio of merged locality to the low-locality threshold; and
   calculating a self-read ratio based on a product of the magnification factor and a predetermined self-read-ratio baseline value.

8. The method of claim 5, further comprising:
   if merged locality fails to satisfy both a predetermined low-locality threshold and a predetermined high-locality threshold, then calculating a magnification factor based on a ratio of the low-locality threshold to merged locality; and
   calculating a self-read ratio based a complementary percentage of a product of the magnification factor and a complementary percentage of a predetermined self-read ratio-baseline value.

9. The method of claim 1, further comprising:
   determining a value for at least one of a low-locality threshold, a high-locality threshold, and a self-read-ratio baseline based at least in part on analyzing system parameters and accessing previous test data.

10. A method for deduplication rehydration, comprising:
    receiving a request to restore a backup image, the backup image being stored in a deduplication system, wherein the backup image comprises a plurality of target data segments;
    determining locality information for at least one of the plurality of target data segments, wherein the locality information comprises information regarding a location of the at least one target data segment in relation to each other target data segment of the plurality of target data segments in the backup image;
    obtaining an identifier of each data container storing the plurality of target data segments of the backup image; and
    prefetching one or more of the plurality of target data segments from a data container based at least in part on a predetermined effectiveness threshold.

11. The method of claim 10, further comprising:
    determining a maximum read length, wherein the maximum read length is based on an allocated memory size for a temporary buffer.

12. The method of claim 11, further comprising:
    selecting a data container, the data container containing one or more target data segments from the backup image.

13. The method of claim 12, further comprising:
    iteratively determining length values for a consecutive sequence of one or more data segments in the data container, comprising:
    a first iteration comprising determining a length of a first target data segment in the data container;
    adding at least one sequential data segment to a current length of the one or more data segments for each subsequent iteration;
    determining a length of target data segments in each subsequent iteration; and
    stopping the iterative determination of length values when a current length value exceeds the maximum read length or the current length of the one or more data segments includes all target data segments in the data container.

14. The method of claim 13, further comprising:
saving the determined length values in an array of length values for each length value that does not exceed a determined length value of a final iteration.

15. The method of claim 14, further comprising:
analyzing the one or more data segments within each consecutive sequence of one or more data segments from the final iteration length value to the shortest length value, wherein the analyzing the one or more data segments comprises determining a number of target data segments included within each consecutive sequence of one or more data segments; and
determining an effectiveness ratio for each consecutive sequence of one or more data segments, the effectiveness ratio comprising a ratio of a length of the one or more target data segments within a first consecutive sequence of one or more data segments to a length value of the first consecutive sequence of one or more data segments.

16. The method of claim 15, further comprising:
wherein, if the effectiveness ratio of an analyzed length satisfies an effectiveness threshold and the effectiveness ratio of the analyzed length is the largest of the effectiveness ratios in the array of length values, then selecting the analyzed length; and
reading all of the data segments from the analyzed length into the temporary buffer.

17. The method of claim 16, further comprising:
reading the target data segments in the temporary buffer into a shared buffer, wherein the shared buffer comprises each of the data segments of the backup image.

18. A computing device configured for improving deduplication rehydration, comprising:
a processor;
memory in electronic communication with the processor, wherein the memory stores computer executable instructions that when executed by the processor cause the processor to perform the steps of:
receiving a request to restore a backup image, the backup image being stored in a deduplication system, wherein the backup image comprises a plurality of data segments;
determining locality information for at least one of the plurality of data segments, wherein the locality information comprises information regarding a location of the at least one data segment in relation to each other data segment of the plurality of data segments in the backup image;
obtaining an identifier of each data container storing the plurality of data segments of the backup image; and
determining a degree to which the plurality of data segments of the backup image are processed by prefetching.

19. The computing device of claim 18, wherein the instructions are executable by the processor to:
calculate a prefetch ratio based on a complementary percentage of a value of a predetermined self-read ratio, the prefetch ratio expressing the degree to which the plurality of data segments of the backup image are processed by prefetching.

20. The computing device of claim 18, wherein the instructions are executable by the processor to:
calculate a data segment sum, wherein calculating the data segment sum comprises summing a number of data segments in the backup image with a number of data segments currently being prefetched by all prefetch threads.

* * * * *